US008621625B1

(12) United States Patent
Bogorad et al.

(10) Patent No.: US 8,621,625 B1
(45) Date of Patent: Dec. 31, 2013

(54) METHODS AND SYSTEMS FOR DETECTING INFECTED FILES

(75) Inventors: Walter Bogorad, Danville, CA (US); Vadim Antonov, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 586 days.

(21) Appl. No.: 12/342,607

(22) Filed: Dec. 23, 2008

(51) Int. Cl.
*G06F 21/00* (2013.01)
(52) U.S. Cl.
USPC ............ 726/23; 713/156; 713/164; 713/165; 705/3; 370/229
(58) Field of Classification Search
USPC .......................................................... 726/23
See application file for complete search history.

(56) References Cited

U.S. PATENT DOCUMENTS

| | | | | |
|---|---|---|---|---|
| 5,406,279 | A * | 4/1995 | Anderson et al. ............... | 341/51 |
| 5,485,575 | A * | 1/1996 | Chess et al. ................ | 714/38.13 |
| 5,826,013 | A * | 10/1998 | Nachenberg ..................... | 726/22 |
| 6,026,166 | A * | 2/2000 | LeBourgeois ............... | 713/156 |
| 6,044,381 | A * | 3/2000 | Boothby et al. ....................... | 1/1 |
| 6,357,008 | B1 * | 3/2002 | Nachenberg ..................... | 726/24 |
| 6,851,057 | B1 * | 2/2005 | Nachenberg ..................... | 726/24 |
| 6,901,413 | B1 * | 5/2005 | Wu ................................ | 707/692 |
| 7,401,080 | B2 * | 7/2008 | Benton et al. .................. | 707/692 |
| 7,617,115 | B2 * | 11/2009 | McNair ............................. | 705/3 |
| 7,832,011 | B2 * | 11/2010 | Obrecht et al. ................. | 726/24 |
| 7,945,956 | B2 * | 5/2011 | Mody et al. ..................... | 726/24 |
| 8,001,595 | B1 * | 8/2011 | Spurlock et al. ................ | 726/22 |
| 8,010,466 | B2 * | 8/2011 | Patinkin .......................... | 706/12 |
| 2003/0065926 | A1 * | 4/2003 | Schultz et al. ................. | 713/188 |
| 2004/0153644 | A1 * | 8/2004 | McCorkendale et al. ..... | 713/156 |
| 2004/0187023 | A1 * | 9/2004 | Alagna et al. .................. | 713/200 |
| 2005/0080816 | A1 * | 4/2005 | Shipp ........................... | 707/104.1 |
| 2005/0273856 | A1 * | 12/2005 | Huddleston ...................... | 726/22 |
| 2006/0056291 | A1 * | 3/2006 | Baker et al. .................... | 370/229 |
| 2006/0101263 | A1 * | 5/2006 | Costea et al. .................. | 713/164 |
| 2006/0130144 | A1 * | 6/2006 | Wernicke .......................... | 726/24 |
| 2006/0230452 | A1 * | 10/2006 | Field ................................. | 726/22 |
| 2007/0083933 | A1 * | 4/2007 | Venkatapathy et al. ......... | 726/25 |
| 2007/0150948 | A1 * | 6/2007 | De Spiegeleer ................. | 726/22 |
| 2007/0174915 | A1 * | 7/2007 | Gribble et al. .................. | 726/24 |
| 2007/0240217 | A1 * | 10/2007 | Tuvell et al. .................... | 726/24 |
| 2008/0127336 | A1 * | 5/2008 | Sun et al. ......................... | 726/22 |
| 2008/0134326 | A2 * | 6/2008 | Abad .............................. | 726/22 |
| 2008/0306872 | A1 * | 12/2008 | Felsher .......................... | 705/51 |

(Continued)

OTHER PUBLICATIONS

Spam and Virus Scanning| http://www.timj.co.uk/uploads/Exim-SpamAndVirusScanning.pdf|Tim Jackson|pp. 1-30, V1.0.12|Nov. 12, 2006|.*

(Continued)

*Primary Examiner* — Mahfuzur Rahman
(74) *Attorney, Agent, or Firm* — ALG Intellectual Property, LLC

(57) ABSTRACT

A computer-implemented method for detecting infected files may include identifying a set of known-clean files. The method may also include identifying a set of characteristics of an unchecked file. The method may further include determine that the unchecked file is related to a clean file in the set of known-clean files. The determination may be based on the set of characteristics of the unchecked file. The method may additionally include determining whether the unchecked file is functionally equivalent to the clean file. This determination may be based on the set of characteristics of the unchecked file. Various other methods, systems, and computer-readable media are also disclosed.

17 Claims, 6 Drawing Sheets

(56) References Cited

U.S. PATENT DOCUMENTS

| | | | |
|---|---|---|---|
| 2009/0013405 A1* | 1/2009 | Schipka | 726/22 |
| 2009/0133125 A1* | 5/2009 | Choi et al. | 726/24 |
| 2010/0054278 A1* | 3/2010 | Stolfo et al. | 370/474 |
| 2010/0100963 A1* | 4/2010 | Mahaffey | 726/25 |
| 2011/0067109 A1* | 3/2011 | Costea et al. | 726/24 |

OTHER PUBLICATIONS

Archive for Aug. 2006; (accessed May 21, 2009); Authentium Virus Blog•, http://blogs.authentium.com/virusblog/?m=200608.

Clemens, Daniel; "IDS Signature for extremely small Portable Executable Files (eg TinyPE)"; Nov. 20, 2008; http://www.packetninjas.net/index.php?s=P%3D3.

* cited by examiner

METHODS AND SYSTEMS FOR DETECTING INFECTED FILES

BACKGROUND

Consumers and businesses increasingly rely on computers to store sensitive data. Consequently, malicious programmers seem to continuously increase their efforts to gain illegitimate control and access to others' computers. Computer programmers with malicious motivations have created and continue to create viruses, Trojan horses, worms, and other programs meant to compromise computer systems and data belonging to other people. These malicious programs are often referred to as malware. In an attempt to evade detection, malicious programmers may infect legitimate programs by injecting malware into the legitimate programs.

Security software companies are combating the growing tide of malware by creating and deploying malware signatures (e.g., hash functions that identify malware) to their customers on a regular basis. However, a significant amount of malware has not yet been identified and therefore cannot be detected using traditional signature-based malware detection.

In addition to or instead of signature-based detection, security software companies may attempt to detect malware through behavioral analysis. In behavioral-analysis technologies, security software may monitor a file in question for malicious behavior. However, behavioral-analysis technologies may have a number of drawbacks. For example, behavioral analysis may be resource intensive, resulting in a negative customer experience. Behavioral analysis technologies may also result in too many false positives and false negatives, interfering with legitimate software while allowing malware to go undetected.

Security software companies may also use white lists to identify known-clean files. While white-listing technologies may result in less false negative determinations than behavioral analysis, white-listing security technologies may be limited in their usefulness. For example, white-listing technologies may not identify relatively unknown or less-popular legitimate files and may prevent such files from executing.

SUMMARY

The instant disclosure is directed to methods and systems for detecting an infected file by determining whether an unchecked file is related to, but not functionally equivalent to, a clean file. In some embodiments, a scanning module may receive an unchecked file and may identify a set of characteristics of the unchecked file. An analysis module may use the set of characteristics to determine whether the unchecked file is related to a clean file. The analysis module may also determine whether the unchecked file is functionally equivalent to the clean file.

If the unchecked file is functionally equivalent to the clean file, the analysis module may determine that the unchecked file is clean (i.e., does not include malware). On the other hand, if the unchecked file is related to the clean file but is not functionally equivalent to the clean file, the analysis module may determine that the unchecked file is infected. The unchecked file may be related to, but not functionally equivalent to, the clean file if the unchecked file is a copy of the clean file that has been modified to include malicious code.

In some embodiments, the analysis module may determine whether an unchecked file is related to and/or functionally equivalent to a clean file by determining a distance between the set of characteristics of the unchecked file and a set of characteristics of the clean file. The distance may be a weighted sum of differences between one or more characteristics in the set of characteristics of the unchecked file and the corresponding characteristics from set of characteristics of the clean file. In some embodiments, the analysis module may exclude variant portions (e.g., serial numbers) of the unchecked and clean files when determining the distance between sets of characteristics of the files.

The analysis module may determine that the distance between the sets of characteristics of the unchecked and clean files is below a predetermined threshold. If the distance is below the predetermined threshold, the analysis module may determine that the unchecked file and the clean file are related. In some embodiments, the analysis module may determine that the unchecked file and the clean file are related if a predetermined number of characteristics of the unchecked file match characteristics of the clean file.

The analysis module may use a distance calculation to determine whether the unchecked file is functionally equivalent to the clean file. For example, if the distance between the set of characteristics of the unchecked file and the set of characteristics of the clean file is zero, the analysis module may determine that the unchecked file is functionally equivalent to the clean file. The analysis module may also use any other suitable process and/or algorithm for determining whether the unchecked file is functionally equivalent to the clean file. Features from any of the above-mentioned embodiments may be used in combination with one another in accordance with the general principles described herein.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
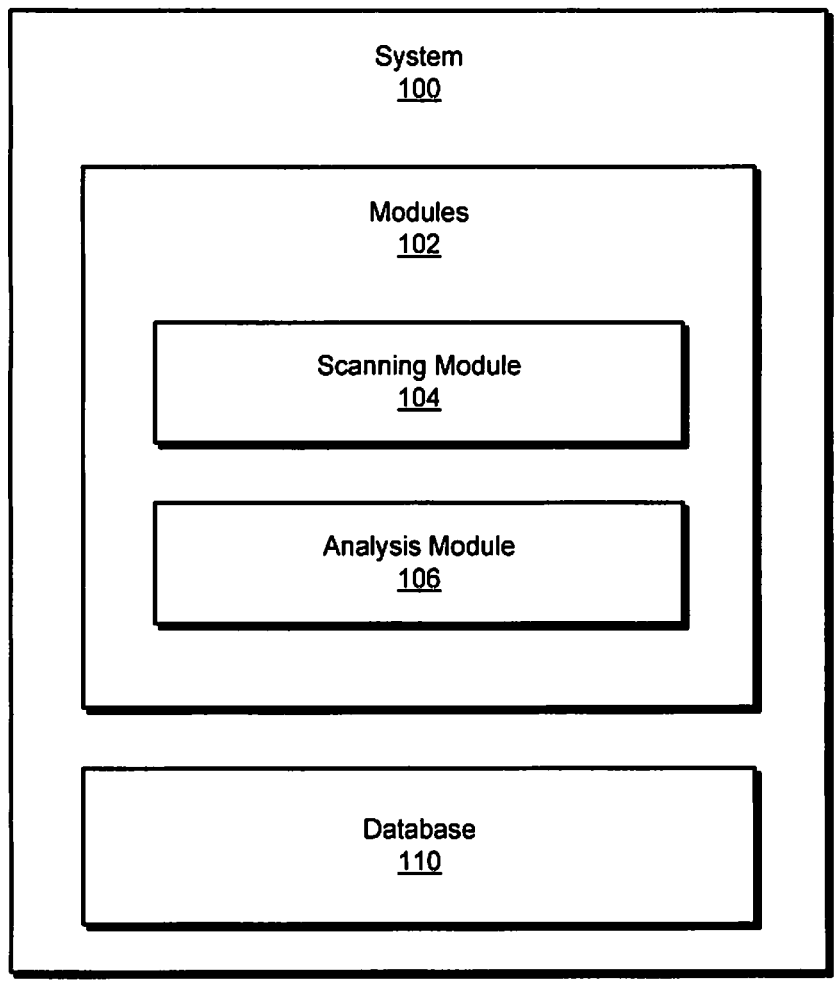
FIG. 1 is a block diagram of an exemplary computing system according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Embodiments of the present disclosure provide various methods and systems for detecting malware. For example, embodiments of the present disclosure may use a scanning module and/or an analysis module to compare an unchecked file to one or more clean files to determine if the unchecked file is infected. Embodiments of the present disclosure may provide various advantages over prior technologies. For example, methods described herein may allow cost-effective and/or timely detection of infected files and may provide increased security against infected files. Some embodiments of the present disclosure may also enable fast detection of polymorphic malware, which may be difficult to detect using traditional signature-based and/or behavioral-based technologies. These and other embodiments, features, and advantages will be more fully understood upon reading the following detailed description in conjunction with the accompanying drawings and claims.

FIG. 1 illustrates an exemplary system 100 for detecting infected files. System 100 may include modules 102, such as scanning module 104 and analysis module 106. Scanning module 104 may be programmed to identify an unchecked file, identify a set of characteristics of the unchecked file, transmit the set of characteristics to analysis module 106, and/or perform any other step in a process for detecting an infected file. Analysis module 106 may be programmed to determine that an unchecked file is related to a clean file, determine whether the unchecked file is functionally equivalent to the clean file, and/or perform any other step in a process for detecting an infected file.

In certain embodiments, one or more of modules 102 in FIG. 1 may represent one or more software applications or programs that, when executed by a computing system, may cause the computing system to perform one or more steps disclosed herein. For example, as will be described in greater detail below, one or more of modules 102 may represent software modules configured to run on one or more computing devices, such as computing system 510 in FIG. 5 and/or portions of exemplary network architecture 600 in FIG. 6. One or more modules 102 in FIG. 1 may also represent all or portions of one or more special-purpose computers configured to perform one or more of the tasks associated with steps disclosed herein.

In addition to modules 102, computing system 100 may also include a database 110. Database 110 may include one or more clean files and/or information associated with one or more clean files. For example, database 110 may include a set of characteristics for each file in a set of known-clean files. Database 110 may represent a portion of one or more computing devices. Database 110 may represent a portion of computing system 510 in FIG. 5 and/or portions of exemplary network architecture 600 in FIG. 6.

Scanning module 104, analysis module 106, and database 110 may be located on a single computing subsystem. In other embodiments, scanning module 104, analysis module 106, and database 110 may be located on two or more computing subsystems. For example, scanning module 104 and analysis module 106 may be located on a first computing subsystem while database 110 may be stored on a second, remote computing subsystem. In other embodiments, scanning module 104 may be located on a first computing subsystem while analysis module 106 and database 110 may be located on a second, remote computing system. In some embodiments, scanning module 104, analysis module 106, and database 110 may be located on three different computing subsystems.

Figure 2:
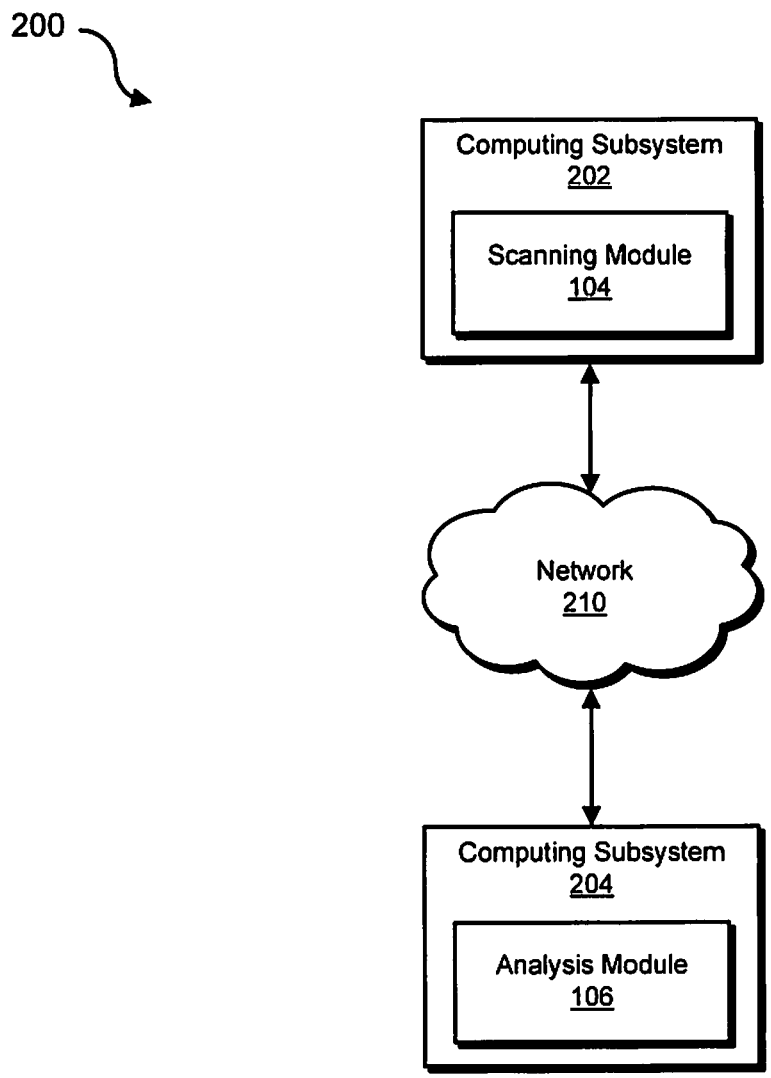
FIG. 2 is a block diagram of another exemplary computing system according to certain embodiments.

FIG. 2 is a block diagram of an exemplary system 200 with scanning module 104 installed on a computing subsystem 202 and analysis module 106 installed on a computing subsystem 204. Database 110 may also be stored on computing subsystem 204. Computing subsystems 202 and/or 204 may include a desktop computer, a laptop computer, a portable-computing device, a workstation, a server, and/or any other suitable computing device.

Computing subsystem 202 and computing subsystem 204 may communicate over a network 210. Network 210 generally represents any medium or architecture capable of facilitating communication or data transfer. Network 210 may include, without limitation, an intranet, a wide area network (WAN), a local area network (LAN), a personal area network (PAN), the Internet, power line communications (PLC), a cellular network (e.g., GSM network), or the like. Network 210 may facilitate communication or data transfer using wireless and/or wired connections.

Figure 3:
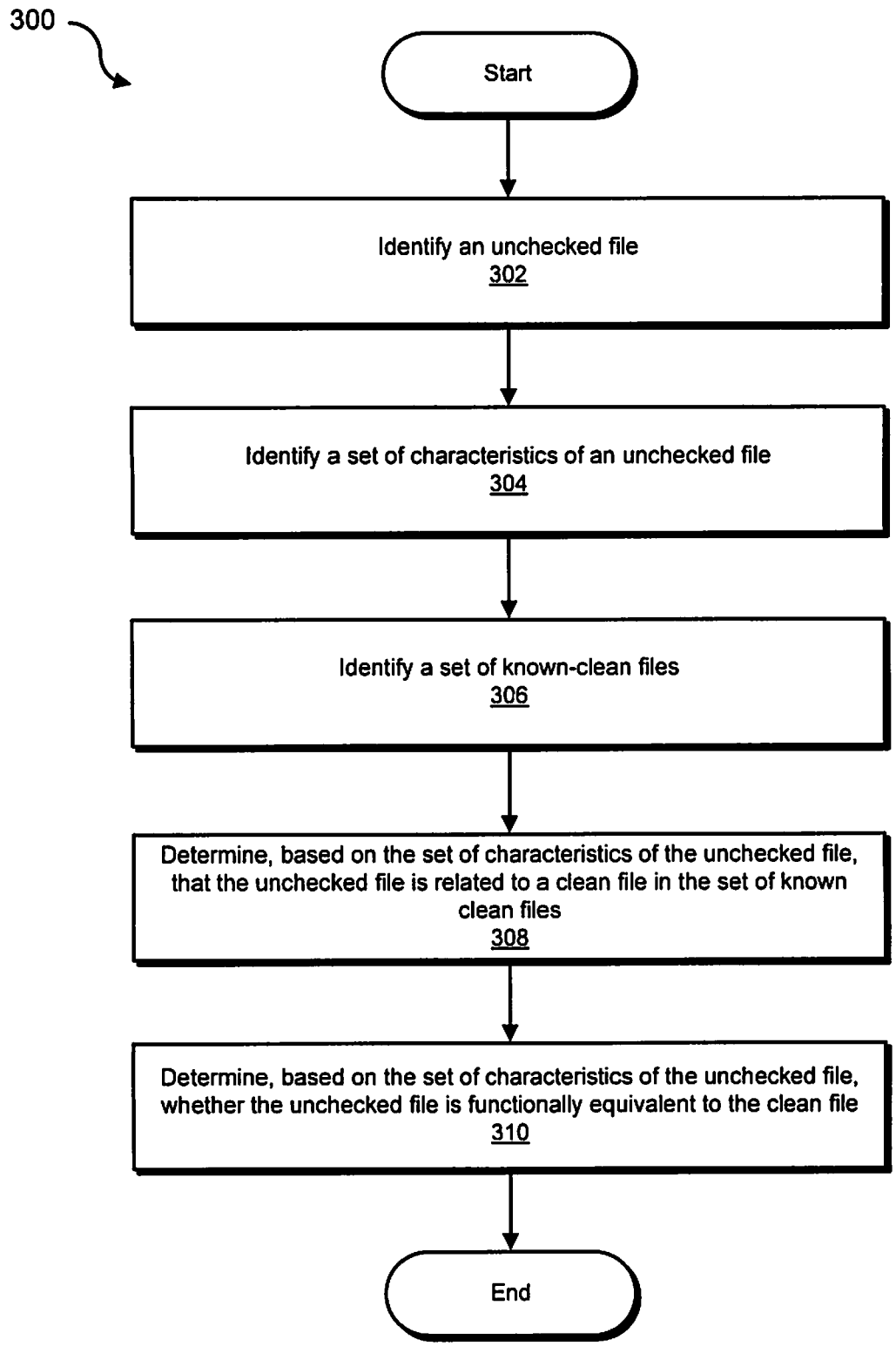
FIG. 3 is a flow diagram of a computer-implemented method for detecting infected files.

FIG. 3 shows an exemplary process for determining whether an unchecked file is infected with malware. The steps shown in FIG. 3 may be performed by scanning module 104, analysis module 106, and/or any other computer-executable code. For example, scanning module 104 may identify an unchecked file on computing subsystem 202 (step 302). Scanning module 104 may identify the unchecked file when computing subsystem 202 attempts to use or access the unchecked file. For example, scanning module 104 may identify the unchecked file when it is first installed on computing subsystem 202. In other embodiments, scanning module 104 may identify the unchecked file when it is downloaded by computing subsystem 202. For example, security software on computing subsystem 202 may monitor computing subsystem 202 for any new executable file transferred to computing subsystem 202. Alternatively, scanning module 104 may identify the unchecked file when the unchecked file is first executed.

An unchecked file may include any file has not been checked for malware. The unchecked file may include any type of file that possibly contains malware. For example, the unchecked file may be a data file or an executable file. An executable file may be formatted according to any suitable executable file format. An example of an executable file format is a Portable Executable (PE) file format. PE-file formats may be file formats used in 32-bit and 64-bit versions of WINDOWS operating systems. Executable files may also include executables for LINUX operating systems, MAC Operating Systems, UNIX operating systems, and/or any other operating systems.

After identifying the unchecked file, scanning module 104 may identify a set of characteristics of the unchecked file (step 304). The set of characteristics may include one or more characteristics and/or attributes of the unchecked file. For example, the set of characteristics may include the file name of the unchecked file, information that may be indicative of the presence of one or more code sequences generally indicative of malware, one or more hashes of one or more portions of the unchecked file, and/or one or more hashes of one or more sections or other fixed-size chunks of the unchecked file.

A hash may include any value, code, sum, or other data calculated using a hash function (e.g., a function that takes an input of a data stream of any length and produces an output with a value of a certain fixed size). A hash function may include a cyclic redundancy check (CRC) hash function. In other embodiments, the hash function may include a cryptographic hash function, such as a message-digest algorithm 5 (MD5) hash function. The hash function may also include a secure hash algorithm (SHA) cryptographic hash function, such as a SHA-0, SHA-1, SHA-256, or SHA-512 hash function. A hash of the unchecked file may also be computed by applying any other public or private hash algorithm to the unchecked file or sections of the unchecked file.

In some embodiments, the set of characteristics may include one or more attributes of one or more sections of the unchecked file. An attribute of a section of the unchecked file may include a section name of the section, a virtual size of the section, a virtual address of the section, a raw data offset of the section, a raw data size of the section, and/or a characteristics bitmap for the section. A characteristics bitmap may be any collection of attributes of the section. For instance, the characteristic bitmap of a file section may indicate the presence of an uncommon instruction in the file section.

The set of characteristics of the unchecked file may include one or more characteristics of one or more invariant portions of the unchecked file. An invariant portion of a file may include a portion of a file that may not change from one copy of the file to another. In contrast, a variant portion of a file may have one value in a first copy of the file but a different value in a second copy of the file. An example of a variant portion of a file may include a serial number that uniquely identifies a copy of the file. In some embodiments, the set of characteristics of the unchecked file may not include any characteristics of variant portions of the unchecked file.

In some embodiments, the set of characteristics may include one or more attributes stored in one or more executable file header fields. Executable file header fields may include file header fields, optional header fields, section header fields, and any other metadata fields that may provide information about the executable file. In some embodiments, using characteristics stored in header fields to determine whether an unchecked file comprises malware may be useful because some malware (e.g., the W95/Anxiety virus) may attack one or more sections of an executable file header. The malware may modify one or more header fields and/or may add one or more section to the executable file.

As part of the process for determining whether the unchecked file is infected, analysis module 106 may identify a set of known-clean files (step 306). A clean file may be any file that has been identified as being free from malware. Analysis module 106 may identify the set of known-clean files by querying database 110 for the set of known-clean files. In some embodiments, analysis module 106 may identify the set of known-clean files by accessing one or more files or file characteristics in database 110. The set of known-clean files may include one or more clean files and/or one or more sets of characteristics of clean files. A set of characteristics of clean files may include one or more characteristics of a clean file. The set of characteristics may include one or more of the characteristics mentioned above in the discussion of characteristics of unchecked files.

After identifying the set of known-clean files, analysis module 106 may determine that the unchecked file is related to a clean file in the set of known-clean files (step 308). In some embodiments, analysis module 106 may compare the set of characteristics of the unchecked file with one or more sets of characteristics of clean files to determine whether the unchecked file is related to a clean file in the set of known-clean files. A set of characteristics of a clean file may include some or all of the same characteristics included in the set of characteristics of the unchecked file. For example, both sets may include the name of the file, hashes of each section of the file, and so forth.

Analysis module 106 may determine that an unchecked file is related to a clean file if one or more characteristics of the unchecked file match one or more characteristics of the clean file. A file may be related to another file if it appears that one file was derived from the other, or that one is a modified version of the other. For example, if two executable files have the same file name and most of their sections are identical, the two files may be related.

In some embodiments, analysis module 106 may determine that an unchecked file is related to a clean file by determining a distance between the set of characteristics of the unchecked file and a set of characteristics of a clean file. A distance between two sets of characteristics may indicate how many of the characteristics from one set do not match characteristics from another set. For example, the sets of characteristics of the unchecked and clean files may include ten hashes representing ten sections of the files. If eight of the ten hashes of the unchecked file match the corresponding eight hashes of the clean file, but the remaining two hashes of the unchecked file do not match the corresponding two hashes of the clean file, the distance between the two sets of characteristics may be two.

Analysis module 106 may use the distance between the set of characteristics of the unchecked file and the set of characteristics of the clean file to determine whether the files are related by determining whether the distance is below a predetermined threshold. For example, if the predetermined threshold is three and the distance between the set of characteristics of the unchecked file and the set of characteristics of the clean file is two, analysis module 106 may determine that the unchecked file is related to the clean file.

According to some embodiments, the distance between the unchecked file and the clean file may be determined by calculating a weighted sum of differences between the set of characteristics of the unchecked file and a corresponding set of characteristics of the clean file. As an example, analysis module 106 may apply a higher weight (i.e., more significance) to some characteristics than other characteristics. Analysis module 106 may also use any other algorithm to determine the distance between the unchecked file and the clean file.

In some embodiments, analysis module 106 may determine that the unchecked file is related to a clean file in the set of known-clean files by first finding the clean file in the set of known-clean files with the smallest distance from the unchecked file. Analysis module 106 may then determine whether the distance is smaller than a predetermined threshold. As previously mentioned, if the distance is smaller than the predetermined threshold, analysis module 106 may determine that the unchecked file is related to the clean file.

In addition to determining whether the unchecked file is related to the clean file, analysis module 106 may determine whether the unchecked file and the clean file are functionally equivalent (step 310). An unchecked file may be functionally equivalent to a clean file if the files are similar and any differences between the two files are not caused by an injection of malicious code into the unchecked file. In certain embodiments, analysis module 106 may determine that the unchecked file and the clean file are functionally equivalent if no invariant (e.g., static) characteristic of the clean file differs from the corresponding characteristic of the unchecked file.

According to some embodiments, analysis module 106 may determine that the unchecked and clean files are functionally equivalent by determining that the distance between the two files is zero. In some cases, analysis module 106 may determine that the distance is zero even when the set of characteristics of the unchecked file is not identical to the set of characteristics of the clean file. For instance, if the two sets are identical except for the file names, analysis module 106 may not count the file name as a functional difference, and may identify the two files as functionally equivalent. As another example, if a software vendor discloses a variant portion of the clean file, analysis module 106 may disregard any differences arising from the variant portion when calculating the distance between the unchecked file and the clean file.

If the unchecked file is functionally equivalent to the clean file, analysis module 106 may identify the unchecked file as clean. For instance, analysis module 106 may transmit a message to scanning module 104 indicating that the unchecked file is clean. However, if the unchecked file and the clean file are related but not functionally equivalent, analysis module 106 may perform a security action. According to some embodiments, the security action may include reporting that the unchecked file is infected. For example, analysis module 106 may transmit a message to scanning module 104 indicating that the unchecked file is infected. In some embodiments, performing the security action may include transmitting an instruction to quarantine the unchecked file. Additionally or alternatively, performing the security action may include reporting the set of characteristics of the unchecked file to a security-software vendor. In various embodiments, performing the security action may include retrieving the unchecked file from the computing system for analysis. For instance, analysis module 106 may transmit a request to scanning module 104 to send a copy of the unchecked file to computing subsystem 204. Analysis module 106 may then perform further analysis on the unchecked file or may forward the unchecked file to a security-software vendor or other computing device.

Scanning module 104 may receive a security determination relating to the unchecked file from a security subsystem (e.g., computing subsystem 204). If the security determination indicates that the unchecked file is infected, scanning module 104 may perform a security action. In some embodiments, scanning module 104 may report the set of characteristics of the unchecked file to a security-software vendor in response to the security determination. In certain embodiments, scanning module 104 may transmit the unchecked file to the security-software vendor for analysis in response to the security determination. In various embodiments, scanning module 104 may quarantine the unchecked file in response to the security determination. Quarantining the unchecked file may include preventing execution of the unchecked file.

Figure 4:
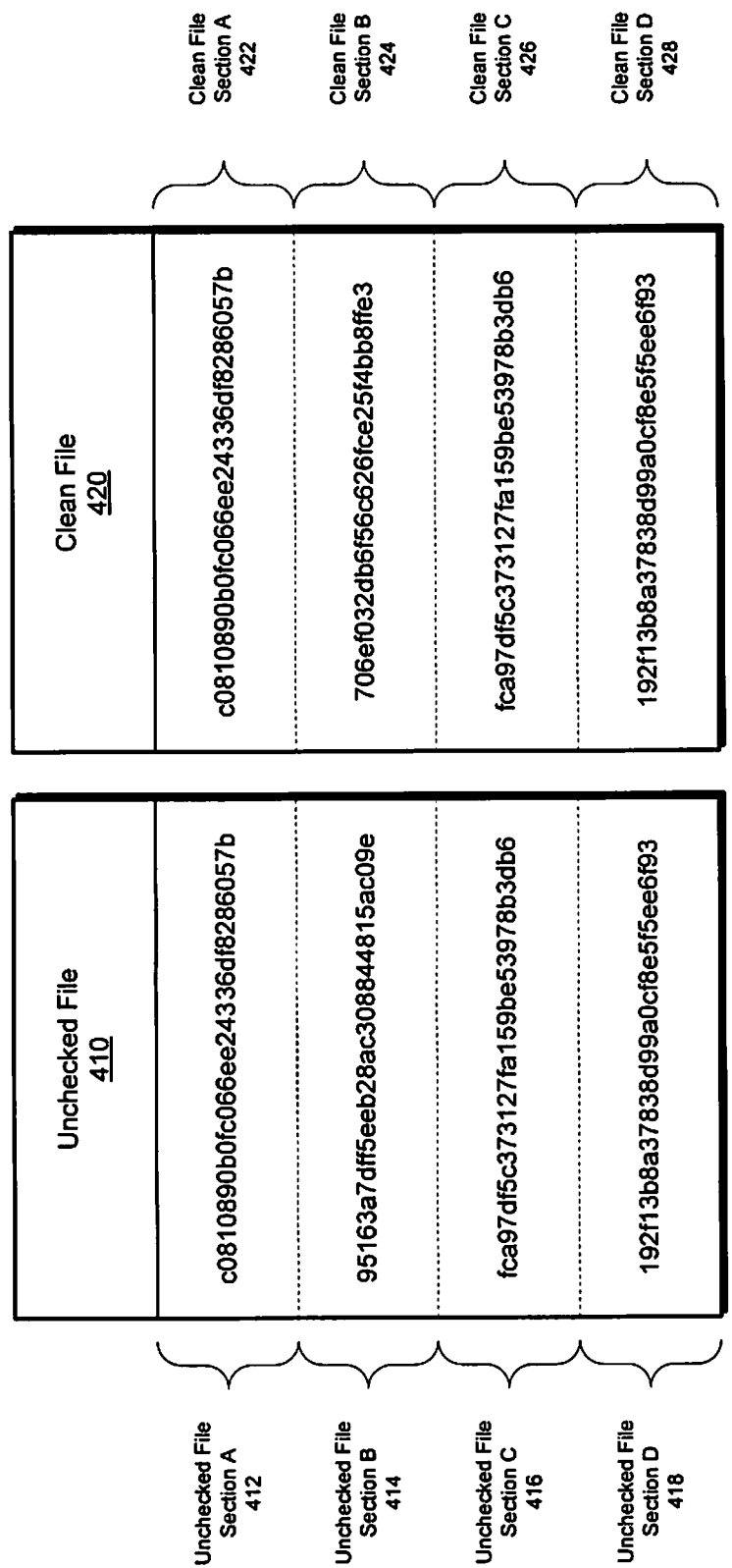
FIG. 4 is a block diagram of two exemplary files.

FIG. 4 is a block diagram of an exemplary unchecked file 410 and an exemplary clean file 420. Unchecked file 410 may be divided into sections A 412, B 414, C 416, and D 418. Clean file 420 may be divided into corresponding sections A 422, B 424, C 426, and D 428. Each section of the files may be represented by a hash of the section. The hashes of unchecked file section A 412 and clean file section A 422 are identical, as are the hashes of unchecked file section C 416 and clean file section C 426. The hashes of unchecked file section D 418 and clean file section D 428 are also identical. The distance between unchecked file 410 and clean file 420 based on those three sections is zero. However, the hash of unchecked file section B 414 is different from the hash of clean file section B 424.

Since the hash of unchecked file section B 414 is different from the hash of clean file section B 424, the distance between unchecked file 410 and clean file 420 may not be zero. For example, if analysis module 106 applies equal weight to each section of unchecked file 410, the distance between the files would be 1. In other embodiments, the weight assigned to unchecked file section B 414 may be greater than 1. For example the weight assigned to unchecked file section B 414 may be 5, resulting in a distance of 5. If the distance threshold for file relationship is 3, then unchecked file 410 and clean file 420 may be determined to be related using the unweighted analysis that results in a distance of 1. However, if analysis module 106 uses the weighted analysis that results in a distance of 5, analysis module 106 may determine that the unchecked file is not related to the clean file.

If the clean file is not related to the unchecked file, analysis module 106 may not be able to use the clean file to determine whether the unchecked file comprises malware. However, if the clean file is related to the unchecked file, analysis module 106 may determine that the unchecked file is infected with malware if the unchecked file is not functionally equivalent to the clean file.

Figure 5:
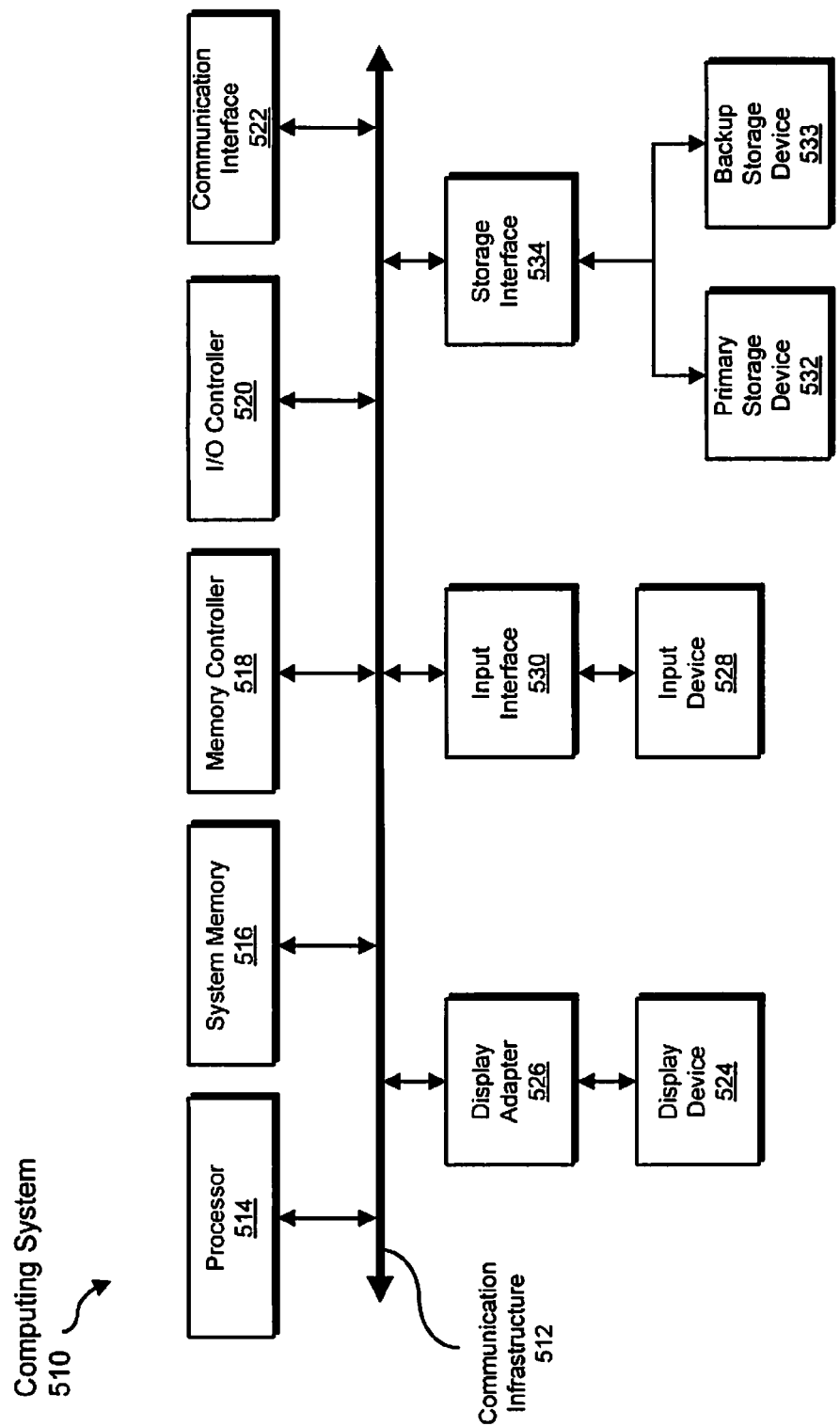
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, Processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, calculating, receiving, excluding, performing, reporting, transmitting, retrieving, and/or generating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments, memory controller 518 may control communication between processor 514, system memory 516, and I/O controller 520 via communication infrastructure 512. In certain embodiments, memory controller 518 may perform and/or is a means for performing, either alone or in combination with other elements, one or more of the steps or features described and/or illustrated herein, such as identifying, determining, calculating, receiving, excluding, performing, reporting, transmitting, retrieving, and/or generating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for identifying, determining, calculating, receiving, excluding, performing, reporting, transmitting, retrieving, and/or generating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments, communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, calculating, receiving, excluding, performing, reporting, transmitting, retrieving, and/or generating steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, calculating, receiving, excluding, performing, reporting, transmitting, retrieving, and/or generating steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the identifying, determining, calculating, receiving, excluding, performing, reporting, transmitting, retrieving, and/or generating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 6:
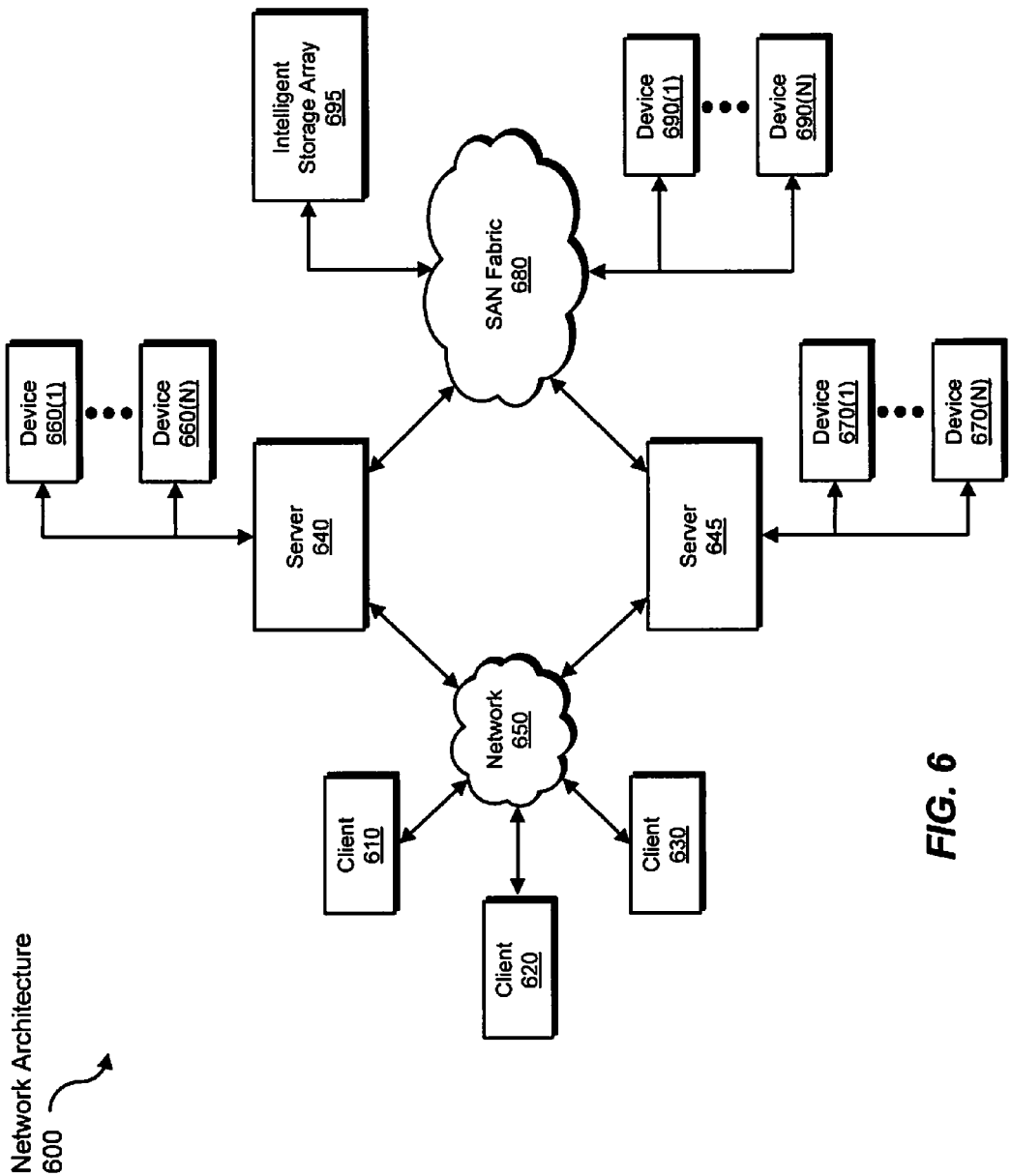
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the internet) for exchanging data, the embodiments described and/or illustrated herein are not limited to the internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and/or distributed to client systems 610, 620, and 630 over network 650. Accordingly, network architecture 600 may perform and/or be a means for performing, either alone or in combination with other elements, one or more of the identifying, determining, calculating, receiving, excluding, performing, reporting, transmitting, retrieving, and/or generating steps disclosed herein. Network Architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, a computer system (e.g., computing system 510 and/or one or more of the components of network architecture 600) may perform a computer-implemented method for detecting infected files. The computer system may identify a set of known-clean files. The computer system may further identify a set of characteristics of an unchecked file. The computer system may then determine that the unchecked file is related to a clean file in the set of known-clean files. The computer system may base the determination on the set of characteristics of the unchecked file. The computer system may further determine, based on the set of characteristics of the unchecked file, whether the unchecked file is functionally equivalent to the clean file.

In certain embodiments, the computer system may identify a set of characteristics of the clean file. The computer system may then determine a distance between the set of characteristics of the unchecked file and the set of characteristics of the clean file. The computer system may determine that the distance is below a threshold. According to certain further embodiments, the computer system may determine that the distance is zero. In some embodiments, the computer system may calculate a weighted sum of differences between characteristics in the set of characteristics of the unchecked file and the set of characteristics of the clean file.

According to some embodiments, the computer system may receive information from a software vendor that identifies one or more variant portions of the clean file. The computer system may also receive information about one or more variant portions of a clean file from any other source. The computer system may exclude the variant portion or portions when determining the distance. In at least one embodiment, a variant portion of the clean file includes a serial number. According to some embodiments, the computer system may receive information from a software vendor that identifies one or more variant portions of the clean file. The computer system may also receive information about one or more variant portions of a clean file from any other source. The computer system may exclude the variant portion or portions when determining the distance between an unchecked file and a clean file. In at least one embodiment, a variant portion of the clean file includes a serial number.

In some embodiments, the set of characteristics of the unchecked file comprises at least one of: 1) a hash of an invariant portion of the unchecked file; 2) a hash of each section of the unchecked file; 3) for each section of the unchecked file, at least one of: i) a name of the section; ii) a virtual size of the section; iii) a virtual address of the section; iv) a raw data offset of the section; v) a raw data size of the section; vi) a characteristics bitmap of the section; 4) a file name of the unchecked file; 5) an identification of common malware code sequences present in the unchecked file.

According to various embodiments, the unchecked file comprises executable code. In some embodiments, if the unchecked file is not equivalent to the clean file, the computer system may perform a security action. Conversely, if the unchecked file is equivalent to the clean file, the computer system may identify the unchecked file as clean.

In various embodiments, the computer system may perform the security action by performing at least one of: 1) reporting that the unchecked file is infected; 2) transmitting, to a computing system on which the unchecked file is located, an instruction to quarantine the unchecked file; 3) reporting the set of characteristics of the unchecked file to a security-software vendor; or 4) retrieving the unchecked file from the computing system for analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for detecting infected files, the computer-implemented method comprising:
   identifying a set of characteristics of at least one invariant portion of an unchecked file;
   identifying a set of known-clean files;
   determining a distance between the set of characteristics of the invariant portion of the unchecked file and a set of characteristics of at least one corresponding invariant portion of a clean file in the set of known-clean files by:
      comparing the set of characteristics of the invariant portion of the unchecked file to the set of characteristics of the corresponding invariant portion of the clean file;
      determining how many characteristics included in the set of characteristics of the invariant portion of the unchecked file do not match the set of characteristics included in the set of characteristics of the corresponding invariant portion of the clean file;
   determining that the unchecked file is related to the clean file in the set of known-clean files based on the distance between the set of characteristics of the invariant portion of the unchecked file and the set of characteristics of the corresponding invariant portion of the clean file being below a threshold;
   determining whether the unchecked file is functionally equivalent to the clean file based on the distance between the set of characteristics of the invariant portion of the unchecked file and the set of characteristics of the corresponding invariant portion of the clean file.

2. The computer-implemented method of claim 1, wherein determining whether the unchecked file is functionally equivalent to the clean file comprises:
   determining that the distance is zero.

3. The computer-implemented method of claim 1, wherein determining the distance comprises:
   calculating a weighted sum of differences between each characteristic in both the set of characteristics of the invariant portion of the unchecked file and the set of characteristics of the corresponding invariant portion of the clean file.

4. The computer-implemented method of claim 1, further comprising:
receiving, from a software vendor, information identifying a variant portion of the clean file;
excluding the variant portion when determining the distance.

5. The computer-implemented method of claim 4, wherein the variant portion of the clean file comprises a serial number.

6. The computer-implemented method of claim 1, wherein:
the set of characteristics of the invariant portion of the unchecked file comprises a hash of the invariant portion of the unchecked file;
determining that the unchecked file is related to the clean file in the set of known-clean files comprises:
comparing the hash of the invariant portion of the unchecked file to a hash of the corresponding invariant portion of the clean file;
determining that the hash of the invariant portion of the unchecked file matches the hash of the corresponding invariant portion of the clean file.

7. The computer-implemented method of claim 1, wherein:
the unchecked file comprises executable code;
the unchecked file is related to the clean file in that the unchecked file is derived from and/or a modified version of the clean file;
the unchecked file and the clean file are functionally equivalent if any differences between the unchecked file and the clean file are not caused by an injection of malicious code into the unchecked file.

8. The computer-implemented method of claim 1, further comprising:
if the unchecked file is not equivalent to the clean file, performing a security action;
if the unchecked file is equivalent to the clean file, identifying the unchecked file as clean.

9. The computer-implemented method of claim 8, wherein the security action comprises at least one of:
reporting that the unchecked file is infected;
transmitting, to a computing system on which the unchecked file is located, an instruction to quarantine the unchecked file;
reporting the set of characteristics of the invariant portion of the unchecked file to a security-software vendor;
retrieving the unchecked file from the computing system for analysis.

10. A system comprising:
a scanning module installed on a first computing subsystem and programmed to:
identify an unchecked file;
generate a set of characteristics of at least one invariant portion of the unchecked file, wherein the set of characteristics comprises information for conducting a comparative static analysis;
transmit the set of characteristics to a second computing subsystem;
an analysis module installed on the second computing subsystem and programmed to:
identify a set of known-clean files;
receive, from the first computing subsystem, the set of characteristics of the invariant portion of the unchecked file;
determine, based on the set of characteristics of the invariant portion of the unchecked file, that the unchecked file is related to a clean file in the set of known-clean files by:
finding the clean file in the set of known-clean files that comprises at least one corresponding invariant portion whose set of characteristics has a smallest distance from the set of characteristics of the invariant portion of the unchecked file, wherein the smallest distance indicates a smallest number of characteristics that do not match and the unchecked file comprises executable code;
determining that the smallest distance is below a threshold;
determine, based on the set of characteristics of the invariant portion of the unchecked file, whether the unchecked file is equivalent to the clean file;
at least one hardware processor configured to execute the scanning module and the analysis module.

11. The system of claim 10, wherein the set of characteristics of the invariant portion of the unchecked file comprises at least one of:
a hash of the invariant portion of the unchecked file;
a hash of each section of the unchecked file;
for each section of the unchecked file, at least one of:
a name of the section;
a virtual size of the section;
a virtual address of the section;
a raw data offset of the section;
a raw data size of the section;
a characteristics bitmap of the section;
a file name of the unchecked file;
an identification of common malware code sequences present in the unchecked file.

12. The system of claim 10, wherein the analysis module is further programmed to transmit, to the first computing subsystem, a security determination associated with the unchecked file.

13. The system of claim 10, wherein the analysis module is further programmed to determine, based on the set of characteristics of the invariant portion of the unchecked file, that the unchecked file is related to the clean file in the set of known-clean files by:
dividing the unchecked file into a plurality of sections;
calculating a hash for each section in the plurality of sections to create a plurality of hashes;
comparing each hash from the plurality of hashes with a hash of a corresponding section of the clean file.

14. The system of claim 10, wherein the analysis module is programmed to determine, based on the set of characteristics of the invariant portion of the unchecked file, that the unchecked file is related to the clean file in the set of known-clean files by:
determining a distance between the set of characteristics of the invariant portion of the unchecked file and a set of characteristics of at least one corresponding invariant portion of each file in the set of known-clean files;
finding the clean file in the set of known-clean files by identifying a file that comprises at least one corresponding invariant portion whose characteristics have a smallest distance from the set of characteristics of the invariant portion of the unchecked file;
determining whether the distance is smaller than a predetermined threshold.

15. The system of claim 10, wherein the scanning module is programmed to determine, based on the set of characteristics of the invariant portion of the unchecked file, that the unchecked file is related to the clean file in the set of known-clean files by determining that the unchecked file is a modified version of the clean file.

16. A non-transitory computer-readable medium comprising one or more computer-executable instructions that, when executed by a computing device, cause the computing device to:
- identify a set of characteristics of at least one invariant portion of an unchecked file;
- identify a set of known-clean files;
- determine a distance between the set of characteristics of the invariant portion of the unchecked file and a set of characteristics of at least one corresponding invariant portion of a clean file in the set of known-clean files by:
  - comparing the set of characteristics of the invariant portion of the unchecked file to the set of characteristics of the corresponding invariant portion of the clean file;
  - determining how many characteristics included in the set of characteristics of the invariant portion of the unchecked file do not match the set of characteristics included in the set of characteristics of the corresponding invariant portion of the clean file;
- determine that the unchecked file is related to the clean file in the set of known-clean files based on the distance between the set of characteristics of the invariant portion of the unchecked file and the set of characteristics of the corresponding invariant portion of the clean file being below a threshold;
- in response to determining that the unchecked file is related to the clean file, determine whether the unchecked file is functionally equivalent to the clean file based on the distance between the set of characteristics of the invariant portion of the unchecked file and the set of characteristics of the corresponding invariant portion of the clean file.

17. The non-transitory computer-readable medium of claim 16, wherein determining whether the unchecked file is functionally equivalent to the clean file comprises determining that the distance is zero.

* * * * *